United States Patent [19]  [11]  4,213,421
Droese et al.  [45]  Jul. 22, 1980

[54] METHOD OF AN INSTALLATION FOR BREEDING SEA-WATER CREATURES IN TANKS

[76] Inventors: K. H. Droese, Wiesenhüttenstr 17, 6000 Frankfurt am Main; Jürgen Flüehter, Am Gasteig 3, 8121 Pähl, both of Fed. Rep. of Germany

[21] Appl. No.: 837,109

[22] Filed: Sep. 28, 1977

[30] Foreign Application Priority Data

Oct. 4, 1976 [ZA] South Africa ............... 76/5924

[51] Int. Cl.² ............................................. A01K 61/00
[52] U.S. Cl. ........................................................ 119/3
[58] Field of Search ............................... 119/2, 3, 4, 5

[56] References Cited

U.S. PATENT DOCUMENTS

| 3,122,126 | 2/1964 | Yamada | 119/3 |
| 3,765,372 | 10/1973 | Moe, Jr. et al. | 119/3 |
| 4,137,868 | 2/1979 | Pryor | 119/2 |
| 4,144,840 | 3/1979 | Bubien | 119/3 |

FOREIGN PATENT DOCUMENTS 2353718  4/1975  Fed. Rep. of Germany ............... 119/3

Primary Examiner—Louis G. Mancene
Assistant Examiner—Robert P Swiatek
Attorney, Agent, or Firm—Becker & Becker, Inc.

[57] ABSTRACT

A method of and installation for breeding sea-water creatures in tanks according to which algae and plankton species forming a preferred food of the sea-water creatures to be bred are grown in feed tanks while the salt content of the water in the feed tanks is adjusted by controlling the sea-water supply to the feed tanks in conformity with the evaporation taking place in the feed tanks. Thus grown plankton species are released from the feed tanks into fish tanks into which the desired sea-water species are introduced in the form of hatches. The fully grown sea-water creatures are withdrawn from the fish tanks and either are eventually sold or a part only is sold while another part as desired breeding stock is conveyed into one or more containers for spawning. The obtained spawn are transferred into one or more additional containers for hatching. Sea-water is in a closed circuit passed through all of these containers after having been filtered. After the hatch has reached a required degree of maturity, it is transferred into the fish tanks.

14 Claims, 3 Drawing Figures

METHOD OF AN INSTALLATION FOR BREEDING SEA-WATER CREATURES IN TANKS

The present invention relates to a method of and installation for breeding sea-water creatures in tanks which are installed on the mainland near the sea. The purpose of this method is the commercial breeding of sea-water creatures suitable for human consumption, such as fish or crustaceans in large quantities and of uniform quality.

The applicant is aware that sea-water creatures have heretofore been bred within small areas separated from the sea, or in containers or cages which are completely accessible to the ocean-current and its food supply. However, this method is not suitable for economical mass production. Above all, the breeding from spawn and larvae is limited. Though natural enemies can be kept away, the infestation with parasites and infections cannot be controlled. Feeding under such conditions cannot be done in an economical manner and is especially difficult when specific plankton components must be made available to delicate creatures.

The applicant is also aware that fish and crustaceans can be bred under laboratory conditions from eggs to larvae or even adult creatures; however, such methods are only satisfactory to a very limited extent when having regard to economic considerations; in particular, they can only be applied for hardy types of fish, but not for tank operation as is possible with fresh-water fish.

The feeding of such creatures was only possible with animal products, as e.g. fish offal, so that the breeding resulted only in a conversion or improvement of animal protein.

It is, therefore, an object of this invention to provide a method of producing and supplying natural protein food in the form of selected live plankton compositions for the complete and exclusive nutrition of sea-water creatures which are kept in large quantities in tanks under natural conditions and water composition while they are shielded from environmental hazards such as natural enemies, parasites and infections, in order to obtain adult and valuable sea-water creatures suitable for human consumption for commercial use.

These and other objects and advantages of the invention will appear more clearly from the following specification in connection with the accompanying drawings, in which.

Figure 1:
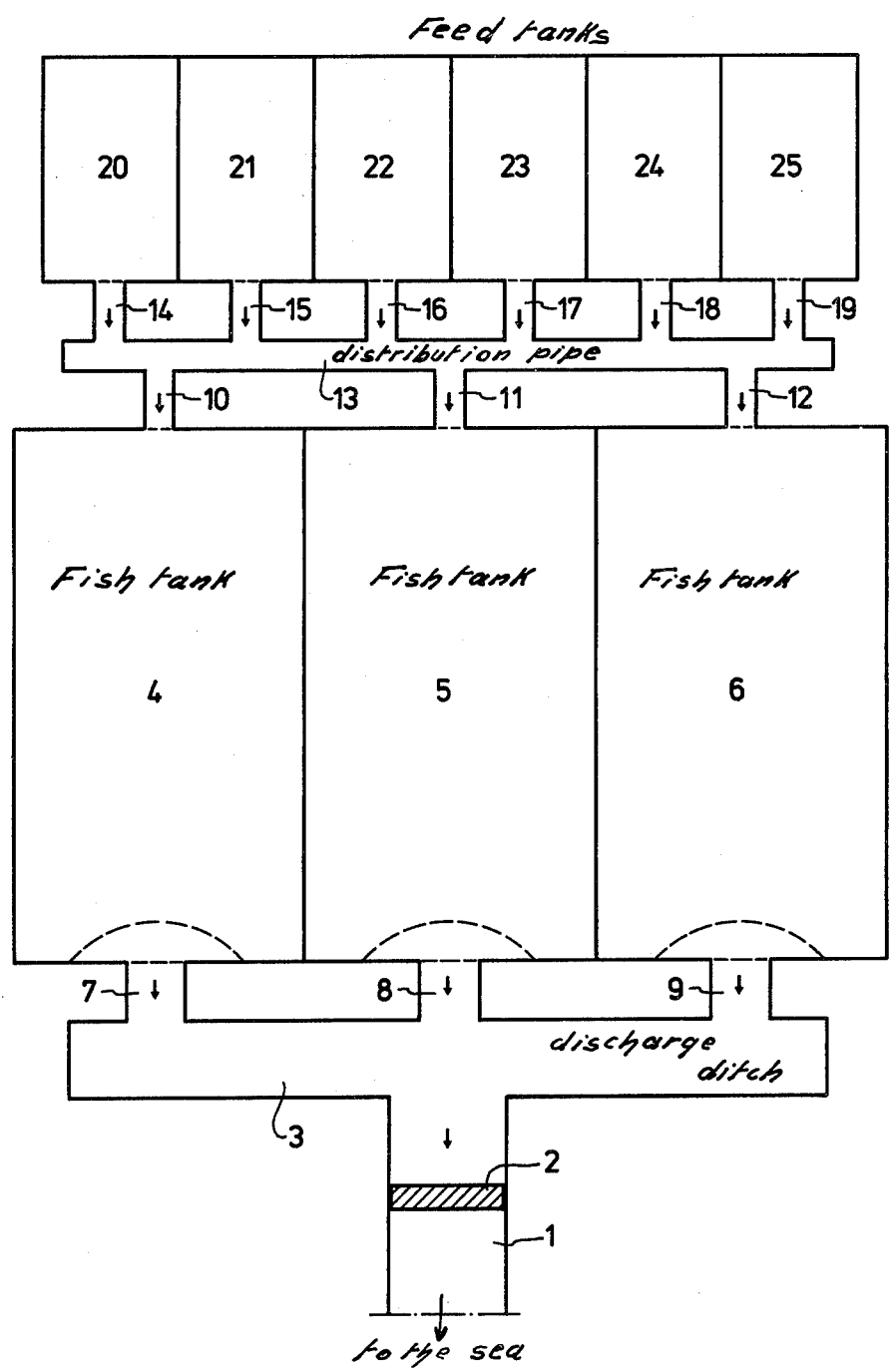
FIG. 1 is a schematic top plan view of the feed and fish tank installation.

In conformity with the present invention, there is provided a method of breeding sea-water creatures in tanks, according to which the desired sea-water species are introduced as hatches into fish tanks which communicate via a pipe system with feed tanks which in turn communicate with the sea and are at a higher level than the fishtanks. The pipe system is constructed in such a manner that desired amounts of sea-water can be supplied to any feed tank and that a connection can be established from each feed tank to each fish tank and that the fish tanks can be individually discharged into a collecting channel which can receive the whole water content of at least one fish tank and which can be discharged, in turn, via a sluice into the sea. The feed tanks are exposed to sunlight in order to produce algae, and mineral and organic fertilizers are added into said feed tanks in order to breed algae therein which offer feed to those plankton species which in turn are preferred food of the sea-water creatures to be bred, the salt content of the water in the feed tanks being adjusted by controlling the sea-water supply in conformity with the evaporation taking place in the feed tanks in order to achieve selective breeding of the algae and plankton species. A feed tank in which the required density of the plankton species is attained is discharged into the fish tanks or into selected fish tanks. The fully grown sea-water creatures are then caught in nets at the outlet of a fish tank when this fish tank is discharged into the collecting channel, and are sold or supplied for canning. Breeding stock taken from the fish tanks is released into containers for spawning and the spawn available is removed from these containers and introduced into other containers of a hatching arrangement. A closed sea-water cycle flows through these containers, and this sea water cycle, after having passed through a filter system, feeds sea-water by means of a pump into an overhead reservoir which supplies the containers containing the breeding stock or the hatch. The hatch obtained is transferred, after having reached a required degree of maturity, into the fish tanks.

The breeding stock can, in the first instance, be caught in the sea, e.g. it may be selected from fish catches. With a continuous operation, the breeding stock can be removed from the fish tanks, according to specific breeding characteristics and reared in the said containers until they spawn. The filtration of the sea-water cycle can be suitably peformed under natural conditions in a water-purification system which contains sand and gravel layers.

The valuable food specific to the sea-water creatures bred can be produced directly in the feed tanks in the water required for rearing the creatures with the use of solar energy and by adding cheap fertilizer materials, such as phosphates and nitrates in order to produce algae as the first member of the food chain used for rearing, which process takes place, outside the fish tanks proper.

By introducing the desired algae cultures and/or plankton species into the feed tanks, a prescribed plankton composition acan be obtained for feeding the sea-water creatures. In most cases, however, the required plankton components are entrained in the sea-water so that the desired plankton composition can be selected and undesirable or harmful components can be suppressed by adjusting the preferred biotope of the desired food components in the feed tanks. This can be done by controlling the salt content of the water in these tanks and the temperature therein by controlling the supply of fresh sea-water.

Because the tanks are suitably constructed in the immediate neighborhood of the sea, the natural coastal slope and the excavated material of the fish tanks can be utilized for raising the feed tanks above the fish tanks. The drop between the bed of the feed tank and the bed of the fish tank is suitably 1 meter. If the discharge channel provided below the fish tanks can only be discharged at low tide and not during high tide, a sluice lock can be provided between the channel and the sea.

A screening or filtering device may be provided in the inlet for the sea-water in order to shield against natural enemies, parasites or infections. Because parasites and harmful substances in the water in the feed tanks can be controlled, the contact between the sea creatures in the fish tanks with harmful substances or parasites can be reliably prevented.

Various types of sea creatures, similar sea creatures of various age or various types of compatible sea creatures or creatures which mutually encourage breeding may be kept in the fish tanks, separated according to tanks.

A substantial advantage of the method described and of the tank arrangement used according to this method lies in the fact that the best biotope for the desired species can be maintained in the fish tanks. A further advantage lies in the fact that the starting material and starting energy for this method are relatively cheap fertilizers, such as nitrates and phosphates, and solar energy.

With these means valuable food protein can be obtained to meet the needs and conditions of even highly delicate sea creatures without it being necessary to add expensive protein which was produced somewhere else but does not, or not completely meet natural conditions, such as fish offal and the like.

Examples of sea creatures which are suitable for the method according to the invention are soles, shrimps and prawns, which can be bred together in the same tanks and with the same food supply.

Referring now to the drawings in detail, the tank intallation represented in FIG. 1 is located near the sea. It is connected with the sea by way of a discharge channel 1 in which is provided a floodgate 2 which prevents high water from passing through this channel. The discharge channel slopes gently towards a beach. At its upper end it ends in a discharge ditch 3 which can accommodate the total content of fish tanks 4, 5, 6 which are located above said ditch. These fish tanks are connected to the discharge ditch by short discharge channels 7, 8, 9 which are conveniently closed on the tank side. The beds of the fish tanks 4,5,6 ascend in direction of the land at a gradient of approximately 1%. Inlets 10, 11, 12 at the upper end of the fish tanks 4,5,6 end in a distributing pipe 13 into which leads outlets 14, 15, 16, 17, 18, 19 from feed tanks 20,21,22,23, 24, 25, which are located farther inland. The beds of these feed tanks at the end nearest to the fish tanks are one meter above the upper end of the bed of the fish tanks.

In order to construct the dams for these feed tanks the excavation material of the fish tanks is used so that the fish tanks aresunk into the shore. The feed tanks, however, are located on the shore. The bed of the feed tanks also ascends inland at a gradient of 1%.

The feed tanks are provided with sea-water filtered by fine screens from the sea via supply pipes (not shown). Lock gates (not shown) are provided in the inlets 10, 11, 12 to the fish tanks and in the outlets 14,15,16,17,18,19 of the feed tanks 20 to 25. These lock gates can be operated individually. Each fish tank can thus be connected individually with each feed tank by opening the respective inlets or outlets. The water and food content of each feed tank can thus be transferred to each fish tank as soon as ample supply of feed plankton has grown in one of the feed tanks. Thus, for instance, the content of feed tank 25 can be discharged into the fish tank 4, and the content of feed tank 20 into fish tank 6. Finally, cross-connections may be established between the individual feed tanks and the individual fish tanks.

The water level in the fish tanks is, as a rule, low in order to obtain a desired heating of the water by solar radiation. The temperature in the individual tanks can be regulated by controlling the water level. The water level in the fish tanks, however, is never so high that the content of the feed tanks cannot be discharged into the fish tanks.

Figure 2:
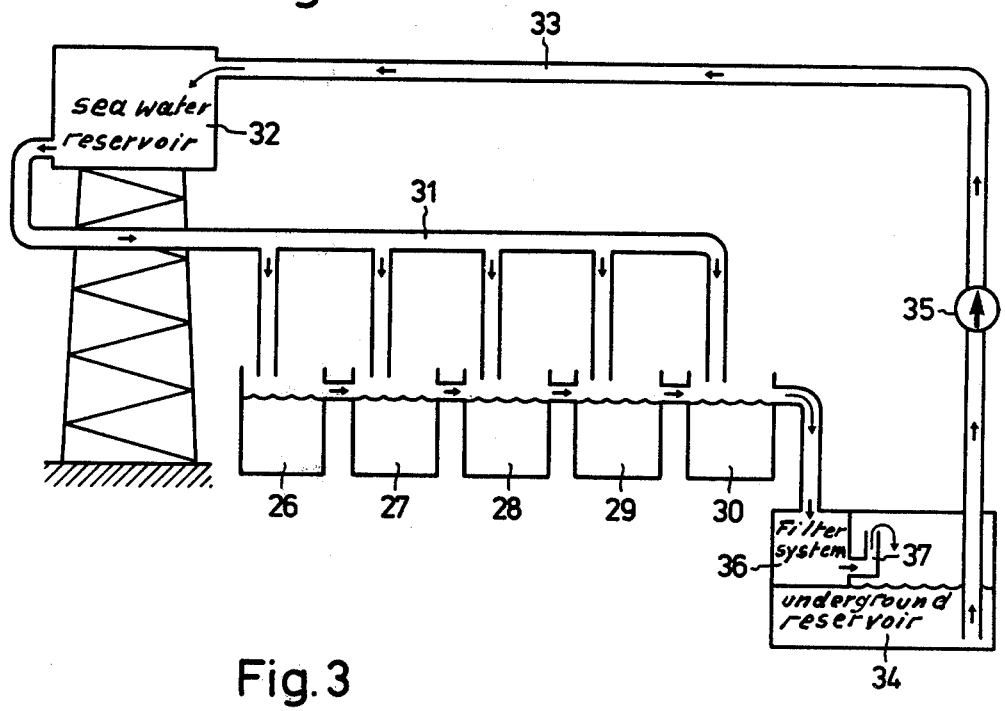
FIG. 2 is a schematic vertical section of a hatching apparatus in association with the aforementioned installation.
Figure 3:
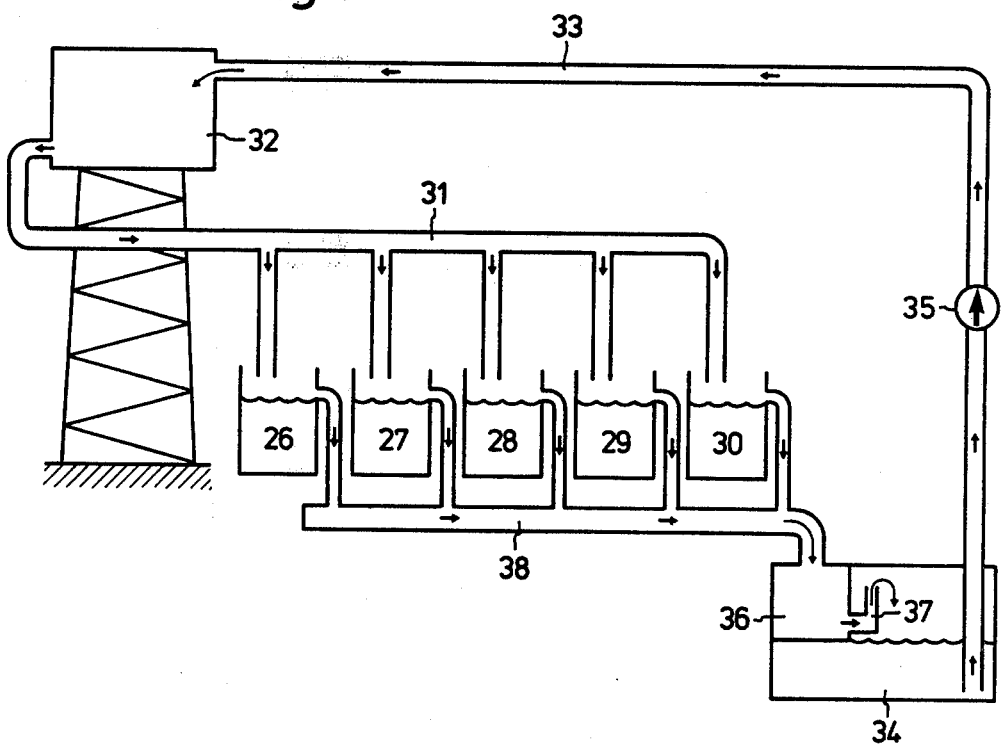
FIG. 3 is another sectional representation of another hatching apparatus of the invention in association with the installation of FIG. 1.

Associated with the tank arrangement is the hatching arrangement illustrated in FIGS. 2 and 3. The hatch is kept in containers 26,27,28,29,30 containing several m$^3$ of water. The containers are individually and continuously supplied with sea-water from an overhead reservoir 32 via a main pipe 31, the overhead reservoir in turn being fed with filtered sea-water via a feed pipe 33 from an underground reservoir 34 with the aid of a pump 35. The filtering of the sea-water is carried out in a filter system 36 which consists of sand and gravel layers onto which is fed the discharge of the containers 26, 27, 28, 29, 30. The discharge of the filter system is an ascending pipe 37 which leads into the underground reservoir 34 thus forming a closed sea-water cycle from which impurities, such a metabolic products and undesirable micro-organisms, can continuously be removed. These containers may be connected in series so that the water from one container flows into the next container, as shown in FIG. 2. The containers 26, 27, 28, 29, 30 may also be connected in parallel as shown in FIG. 3 so that each container discharges individually into a main discharge pipe 38. This has the advantage that different biological conditions can be maintained in each container and, on the other hand, that infections can be contained. Series connections as well as parallel connections may be provided, the connections then being optionally switchable with the aid of lock gates.

From the plankton naturally contained in the sea-water, a culture can be developed under the influence of solar heat. By adding phosphates and nitrates and by adjusting the desired salt content by controlling the sea-water supply depending on the rate of evaporation, it is possible to develop those types of algae which are the preferred source of nutrition for those plankton organisms which are, in turn, a preferred food of the fish, e.g. soles to be reared, so that intermediate links in this nutrition chain may be formed. In the algae culture, sunlight is utilized by photosynthesis for producing food. It is understood that such an installation can only be used in latitudes of adequate solar radiation and sufficient length of day time. The feed tanks are successively discharged into the fish tanks as soon as the plankton content has attained a predetermined maximum quantity. Hatches of soles which were reared in the hatching apparatus and are mature enough to be used, are released into the fish tanks into which filtered sea-water has been pumped by way of the feed tanks, supply pipes and the connection thereof with the fish tanks. The hatches are allowed to remain in these fish tanks until they are large enough to be utilized. During this time they are fed with the plankton produced in the feed tanks by alternately discharging the feed tanks. The fully grown fish are then caught in nets at the outlets of the fish tanks while the water of the fish tanks is discharged by way of the discharge ditch 3.

Because it is extremely difficult to catch spawn from soles or larvae from soles naturally available in the sea, a hatchery must be maintained for the continuous operation of the method, the operation of this hatchery being a necessary and integrated procedure of the method. Spawn, larvae and hatches of soles react extremely sensitively to variations in the composition and temperature of the water, as well as to incorrect feeding, so that all influences which could disturb the very narrow biotope conditions must be excluded and these biotope conditions must be carefully met in the hatchery. The temperature may be controlled by the ambient temperature and by adding fresh water, while the salt content of the water is accurately adjusted by the use of sea-water, because no substantial evaporation can occur as a result of the closed installation.

In order to start the process initially, breeding stock caught in the sea, and later selected breeding stock from the fish tanks, are released into the containers 26, 27, 28, 29, 30 through which sea-water flows in a closed cycle and the spawn from the breeding stock is obtained in screens or with nets at the outlets of these containers. This spawn is then introduced into other of these containers which are only used for rearing the hatches, and are kept therein until they are mature enough to be released into the fish tanks. The plankton removed from the feed tanks 20, 21, 22, 23, 24, 25 and obtained by the above described process is used for feeding the breeding stock and the hatches In the same manner, e.g., shrimps and prawns can be bred and reared besides soles and can be released together with the soles into the same fish tanks and be caught together with the soles.

It is, of course, to be understood that the present invention is, by no means, limited to the specific showing in the drawings, but also comprises any modifications within the scope of the appended claims.

What we claim is:

1. A method of breeding sea-water creatures in tanks, which includes in combination the steps of: filling feed tanks with sea-water, in said feed tanks growing algae and plankton species forming a preferred food of the sea-water creatures to be bred while adjusting the salt content of the sea-water in said feed tanks by controlling the sea-water supply to the feed tanks in conformity with the evaporation taking place in said feed tanks, releasing grown plankton species from said feed tanks by controlled distribution into fish tanks and introducing thereinto the desired sea-water creatures in the form of hatches, withdrawing fully grown sea-water creatures from said fish tanks while at least from time to time transferring some of said last mentioned withdrawn sea-water creatures into at least one container for spawning, transferring the spawn obtained in said at least one container into at least one additional container for hatching, filtering sea-water and passing the filtered sea-water in a closed circuit through all of said containers, and after the hatch in said at least one additional container has reached a required degree of maturity transferring said last mentioned hatch into said fish tanks, and locating the upper ends of said fish tanks about one meter below the bottom of said feed tanks.

2. A method according to claim 1, which includes the step of introducing mineral and organic fertilizers into said feed tanks to aid the growing of algae in said feed tanks.

3. A method according to claim 1, in which the fertilizer introduced into the feed tanks comprises phosphates and nitrates.

4. A method according to claim 1, which includes utilizing solar energy for aiding the growing of algae in said feed tanks.

5. A method according to claim 1, which includes the step of filtering the sea-water before its entrance into said feed tanks.

6. An installation for breeding sea-water creatures in tanks, which includes in combination: feed tanks for receiving and growing algae and planktons, first conduit means establishing fluid communication between said feed tanks and a source of sea-water for conveying sea water to said feed tanks, seaside fish tanks, second conduit means for selectively conveying planktons from said feed tanks into said fish tanks, said feed tanks being located inland at a higher level than said fish tanks, and a hatchery including container means for receiving and accommodating breeding stock of the sea-water creatures to be bred and to be introduced into said fish tanks therewith.

7. An installation for breeding sea-water creatures in tanks, which includes: feed tanks for receiving and growing algae and planktons, first conduit means establishing fluid communication between said feed tanks and a source of sea-water for conveying sea-water to said feed tanks, fish tanks, second conduit means for selectively conveying planktons from said feed tanks into said fish tanks, said feed tanks being located at a higher level than said fish tanks, a hatchery including container means for receiving and accommodating breeding stock of the sea-water creatures to be bred and to be introduced into said fish tanks, and distributing pipe means including shut-off valve means for selectively effecting communication between any one of said feed tanks and any one of said fish tanks.

8. An installation according to claim 7, which includes a discharge ditch located at a level lower than said fish tanks and said source of sea-water, said discharge ditch having a capacity sufficient to receive the content of all of said fish tanks.

9. An installation according to claim 7, in which the beds of said fish tanks and of said feed tanks ascend from their outlets at a gradient of approximately 1%.

10. An installation according to claim 7, in which the bottoms of said feed tanks are located approximately 1 meter above the upper parts of said fish tanks.

11. An installation according to claim 7, in which said container means of said hatchery include a plurality of containers arranged in parallel to each other.

12. An installation according to claim 7, in which said container means of said hatchery includes a plurality of containers arranged in series with regard to each other.

13. An installation according to claim 7, in which said container means of said hatchery have communication with a closed circuit for receiving and passing sea-water therethrough, and filter means in said circuit for filtering the sea-water prior to passing through said circuit.

14. An installation according to claim 13, in which said filter means include sand and gravel layers.

* * * * *

UNITED STATES PATENT OFFICE
CERTIFICATE OF CORRECTION

Patent No. 4213421     Dated 22 July 1980

Inventor(s) K. H. DROESE ET AL

It is certified that error appears in the above-identified patent and that said Letters Patent are hereby corrected as shown below:

[76] Inventors: K. H. Droese, Wiesenhüttenstr. 17, 6000 Frankfurt am Main; Jürgen Flüchter, Am Gasteig 3, 8121 Pähl, both of Fed. Rep. of Germany Signed and Sealed this Fourteenth Day of October 1980

[SEAL]

*Attest:*

SIDNEY A. DIAMOND

*Attesting Officer*     *Commissioner of Patents and Trademarks*